United States Patent

Lottes

[11] Patent Number: 6,079,519
[45] Date of Patent: Jun. 27, 2000

[54] COMBINED FILL AND RELIEF VALVE

[75] Inventor: Robert Emil Lottes, Dubuque, Iowa

[73] Assignee: Deere & Company, Moline, Ill.

[21] Appl. No.: 09/190,904

[22] Filed: Nov. 12, 1998

[51] Int. Cl.$^7$ .................................................. F01M 11/04
[52] U.S. Cl. ..................... 184/105.1; 137/226; 137/512.2
[58] Field of Search .................. 91/432, 468; 184/105.1; 137/115.18, 115.2, 226, 512, 512.2, 102

[56] References Cited

U.S. PATENT DOCUMENTS

| | | | |
|---|---|---|---|
| 1,004,986 | 10/1911 | Burkett . | |
| 1,039,804 | 10/1912 | Richart | 137/512 |
| 1,114,796 | 10/1914 | Nickel . | |
| 1,369,343 | 2/1921 | Lamb . | |
| 2,720,283 | 10/1955 | Lares | 184/105.1 |
| 2,954,796 | 10/1960 | Marshall | 137/226 |
| 3,314,440 | 4/1967 | Horowitz | 137/226 |
| 3,385,062 | 5/1968 | Cadmus | 60/54.5 |
| 3,426,787 | 2/1969 | Fuller | 137/226 |
| 3,542,062 | 11/1970 | Zahid et al. | 137/512.3 |
| 3,626,977 | 12/1971 | Riley et al. | 137/516.25 |
| 3,747,626 | 7/1973 | Valentino | 137/102 |
| 3,756,349 | 9/1973 | Kluh | 184/105.1 |
| 3,963,047 | 6/1976 | Moring | 91/432 |
| 3,967,635 | 7/1976 | Sealfon et al. | 137/512.2 |
| 4,893,650 | 1/1990 | Chisholm et al. | 137/539 |
| 4,948,092 | 8/1990 | Kasper et al. | 251/82 |
| 5,694,969 | 12/1997 | DeVuyst | 137/226 |

*Primary Examiner*—Stephen M. Hepperle

[57] ABSTRACT

A combined fill and relief valve is provided for a fluid chamber containing grease under pressure relative to surrounding atmosphere. The valve includes a housing having a longitudinal bore, the longitudinal bore including an inlet and an outlet. The housing also includes a transverse relief port in fluid communication with the atmosphere. A grease fitting is fixed to the housing against relative movement and is in fluid communication with the longitudinal bore. A fill valve assembly is fitted in the longitudinal bore and selectively permits flow therethrough from the inlet to the outlet. A relief valve assembly is fitted in the longitudinal bore and controls fluid passage between the outlet and the relief port.

18 Claims, 2 Drawing Sheets

COMBINED FILL AND RELIEF VALVE

BACKGROUND OF THE INVENTION

1. Field of the Invention

The present invention relates to fluid fill and relief valves. More specifically, the invention relates to an assembly combined fill and relief valve contained within a singular housing.

2. Description of Related Art

Fill valves are commonly configured as simple check valves which permit fluid flow in one direction (e.g., from inlet to outlet) but not in the reverse. Such valves are provided with inlet and outlet ports and function generally to permit fluid flow therethrough from inlet to outlet when the pressure at the inlet exceeds that at the outlet (an additional amount of pressure may be needed to overcome a small spring force used to bias the valve closed), and to prevent fluid flow therethrough from outlet to inlet when the pressure at the outlet exceeds that at the inlet. Use of a check-type fill valve alone may be inadequate because the pressure of the fluid introduced to a fluid chamber to which the valve is coupled may exceed the limitations of the fluid chamber. For this reason check-type fill valves are often used in conjunction with a separate relief valve.

Relief valves are designed to prevent backflow from the outlet until pressure on a valve element overcomes a force biasing the valve element against a valve seat, after which the valve opens, releasing pressure so that pressure of fluid in the fluid chamber may be maintained at or below a desired maximum pressure. Therefore, the use of a relief valve in conjunction with a fill valve allows pressure to build within the fluid chamber to a desired level while preventing damage to the fluid chamber to which the valve is attached by allowing excess fluid to be vented.

Some configurations of a fluid chamber and some environments present space limitations which prevent the use of separate fill and relief valves. Where there is only room for one valve, a fill valve may be used to prevent backflow of fluid from outlet to inlet. However, use of a fill valve alone will allow a buildup of fluid pressure within the fluid chamber until some component of the valve or fluid chamber fails. The fluid chamber may be designed to fail at a pre-set maximum pressure, but replacement of a failed fluid chamber represents an expensive and time-consuming process which might be eliminated with the inclusion of a relief valve.

The combination of fill and relief valves in a single housing is known. For example, U.S. Pat. No. 1,004,986, the disclosure of which is hereby incorporated by reference, shows a safety valve for pneumatic tires which is designed to prevent explosion of a tire due to excessive air pressure. Two valves are provided in a single casing. The mechanism includes a valve stem which is slidable so that, upon actuation of the relief valve, a portion of the valve stem is slid to the exterior of the casing and exposed to the surrounding atmosphere. The valve stem returns when the excess pressure is abated. Such a valve is not viable in a dirty environment because contaminants such as dirt particles are likely to be introduced which may affect the proper function of the valves. Also, the axial movement of the valve stem outside the housing is undesirable because the stem may more easily be broken off.

U.S. Pat. No. 3,747,626, the disclosure of which is hereby incorporated by reference, teaches a combined fill and relief valve. The fill valve is spring-biased toward an open position as shown in FIG. 1, so that dirt or other contaminants may more easily be introduced. Also, the valve elements are of complex shape including "nipple-like protrusions" and complementary depressions.

These and other conventional valves which combine relief and fill check functions are not suitable for applications in dirty environments. A further shortcoming of conventional valves is their failure to provide features to prevent sudden loss of pressure as the valve is removed Therefore the use of such a valve with grease, for example, presents a possibility of an undesirable sudden expulsion of grease or the valve housing itself (possibly toward the operator) when the valve is unseated from the fluid chamber.

SUMMARY OF THE INVENTION

It is therefore an object of the invention to provide a combined fill and relief valve which is of simple construction and will perform its operation reliably with reduced risk of breakage and contamination.

It is also an object of the invention to provide such a valve which will automatically vent excess pressure as the valve is removed from a fluid chamber.

The present invention provides a combined fill and relief valve for providing grease to a fluid chamber under pressure. Relief and fill valve assemblies are combined in singular compact housing, each functioning independently. The fill valve assembly allows a fluid chamber to which the valve is coupled to be pressurized with fluid, while the relief valve assembly prevents pressure within the fluid chamber from exceeding a desired preset level. Movement occasioned by performance of fill and relief functions is confined within the housing. The valve provides automatic pressure relief through a transverse relief port when pressure exceeds a force biasing the relief valve assembly closed. In a preferred embodiment of the invention, pressure relief is also prompted when the valve is removed from the fluid chamber, helping to prevent undesirable consequences of a more sudden release of pressurized fluid.

DETAILED DESCRIPTION

Figure 1:
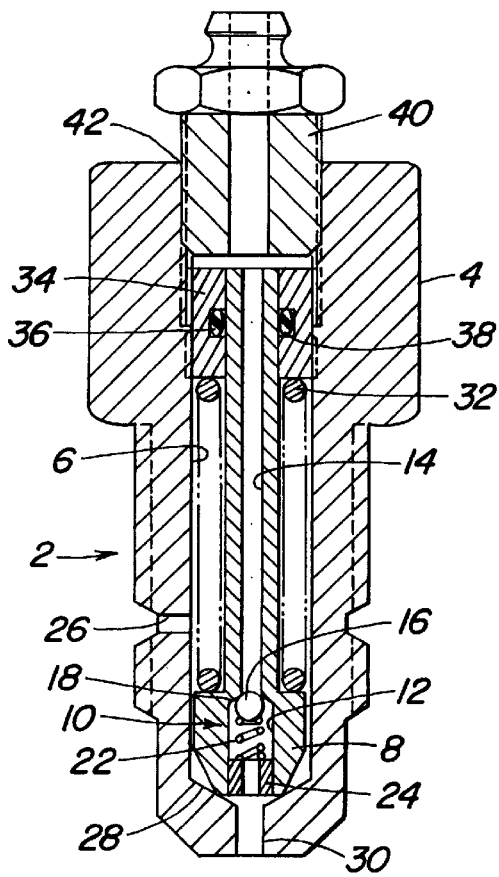
FIG. 1 is a longitudinal cross sectional view of a combined relief and fill valve according to a first embodiment of the present invention.

A first embodiment of a combined fill and relief valve 2 is depicted in FIG. 1 and comprises a housing 4 having an longitudinal bore 6 into which a hollow relief valve element 8 is slidably fitted. A fill valve assembly 10 is provided at an enlarged diameter section 12 of the hollow relief valve element 8 at the outlet end of the relief valve element 8. The fill valve assembly 10 includes a fill valve element 16 (a check ball) seated against a tapered fill valve seat 18 (a shoulder formed at the inner end of the enlarged diameter section 12). A spring 22 seats against a press-fit member 24 at the outlet end of the relief valve element 8 and biases the fill valve element 16 toward the fill valve seat 18. A transverse relief port 26 extends through the housing 4.

A tapered relief valve seat 28 is formed at a transition of the longitudinal bore 6 to a smaller diameter portion 30. A relief valve spring 32 is compressed by a threaded fitting 34 to set a desired relief pressure. The threaded fitting 34 holds a resilient seal 36 in a recess 38. Adjustment of the threaded fitting 34 determines the force of the spring 32 which must be overcome to unseat the relief valve element 8 from the relief valve seat 28.

A standard grease fitting 40 is threaded into the housing 4 at an inlet 42. The grease fitting 40 may contain an internal check valve, although check valves in standard grease fittings are generally not designed for high pressure applications. Therefore, the fill valve assembly 10 provided in this embodiment will generally not be merely redundant.

The transverse relief port 26 is insulated from fluid communication with a hollow portion 14 of the relief valve element 8 so that the relief port 26 is inaccessible to fluid passing from the inlet 42 to the outlet 30 through the relief valve element 8.

A fluid fill path extends longitudinally from the inlet 42 through the hollow bore 14 of the relief valve element 8 one-way communication of fluid is permitted by the fill valve assembly 10 to the outlet 30.

A relief path is defined by the portion of the bore 6 external to the relief valve element 8, and the transverse relief port 26. When the force on relief valve element 8 due to the pressure in a fluid chamber to which the valve 2 is coupled exceeds the force of the relief spring 32, the relief valve element 8 will slide upward as seen in FIG. 1. The relief valve element 8 is thereby disengaged from the relief valve seat 28, allowing fluid to flow from the fluid chamber to the atmosphere. When pressure in the fluid chamber is relieved so that the farce of the relief valve spring 32 overcomes the pressure in the fluid chamber, the relief valve element 8 will be forced downward into sealing engagement with the relief valve seat 28 to prevent further loss of pressure from the fluid chamber.

Figure 2:
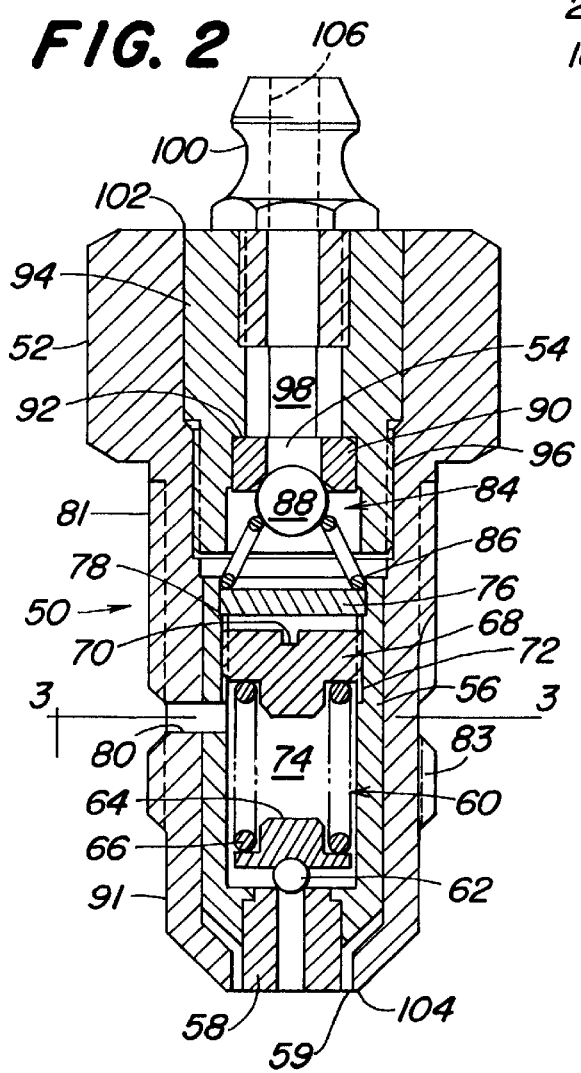
FIG. 2 is a longitudinal cross section of a combined relief and fill valve according to a further embodiment of the present invention.

FIG. 2 shows a second embodiment of a combined fill and relief valve 50. A housing 52 has a longitudinal bore 54 into which a relief chamber sleeve 56 is press fit. A relief valve member 58 is press fit into the relief chamber sleeve 56 at the outlet 59 of the housing A relief valve assembly 60 is shown in its closed position and comprises a relief valve element 62 sealingly engaged with a relief valve seat 64 at an inner end of the relief valve seat member 58. The relief valve element 62 is held in place by a relief valve element guide 64 having a diameter smaller than an interior diameter of the relief chamber sleeve 56 to provide a clearance therebetween. The relief valve element guide 64 is in turn biased against the relief valve element 62 by a relief valve spring 66. The relief valve spring 66 is compressed by an externally threaded relief valve adjustment head 68 having a slot 70 adapted for receiving a screwdriver head for setting the position of the relief valve adjustment head 68 along a threaded portion 72 of the relief chamber sleeve 56. A relief chamber 74 comprises a volume defined by the relief chamber sleeve 56, the relief valve seat member 58 and the relief valve adjustment head 68. Above the relief valve adjustment head 68 as seen in FIG. 2 is positioned a fill valve base 76 which rests on a shoulder 78 formed at the inner end of the threaded portion 72 of the relief chamber sleeve 56.

A transverse relief port 80 extends through the housing 52 and the relief chamber sleeve 56 so that the relief chamber 74 may be in fluid communication with the atmosphere. As may be seen in FIG. 3, the relief chamber sleeve 56 is configured as a rounded square, providing four fill channels 82 between the relief chamber sleeve 56 and the housing 52 and isolated from fluid communication with the transverse relief port 80.

A fill valve assembly 84 is positioned on the fill valve base 76 and comprises a tapered fill valve spring 86, a fill valve element 88 (configured as a spherical check ball) and a hollow fill valve seat 90. The fill valve seat 90 pressed against a shoulder 92 in a hollow fill valve adjustment sleeve 94. The fill valve adjustment sleeve 94 has external threads which engage a threaded portion 96 of the longitudinal bore 54 of the housing 52. The fill valve spring 86 biases the fill valve element 88 into sealing engagement with the fill valve seat 90 so that the fill valve assembly 84 is shown in a closed position. The pressure required to disengage the fill valve element 88 from the fill valve seat 90, opening the fill valve assembly 84, may be set by threading the fill valve adjustment sleeve 94 into or out of the housing 52 (changing compression on the fill valve spring 86). This adjustment may be accomplished using a standard hexagonal wrench inserted in an internally hexagonal portion 98 of the fill valve adjustment sleeve. The top portion of the fill valve adjustment sleeve 94 as viewed in FIG. 2 is provided with internal threads for receiving a standard grease fitting 100 at an inlet 102 of the housing 52.

During a typical use of the valve 50, a base 104 of the housing 50 is in sealing engagement with a fluid chamber. Fluid is introduced (for example, by a grease gun) at the grease fitting 100. Fluid will flow through a fluid fill path comprising an internal bore 106 of the grease fitting 100, the hollow interior of the fill valve adjustment sleeve 94 and, as fluid pressure builds enough to disengage the fill valve element 88 from the fill valve seat 90, around the fill valve element 88 and through the fill channels 82 to the outlet 59 and into the fluid chamber. When fluid pressure downstream of the fill valve assembly 84 (plus the force of the fill valve spring 86) is greater than upstream pressure, the fill valve assembly 84 will close, preventing fluid loss.

If fluid pressure at the outlet 59 builds enough to overcome the force of the relief valve spring 66, the relief valve element 62 is disengaged, opening the relief valve assembly 60. Fluid then flows through the hollow relief valve seat member 58 into the relief chamber 74 and out through the transverse relief port 80. Fluid will continue to flow from the outlet 59 to the transverse relief port 80 until the pressure at the outlet 59 abates to a level which may be overcome by the force of the relief valve spring 66, causing the relief valve assembly 60 to close. When the pressure at the outlet 59 does not exceed the preset pressure limit (based on the compression of the relief valve spring 66), the relief valve assembly 60 will remain closed and pressure may continue to build.

One application for which the valves described herein are particularly well suited is a track tensioning system of a track-laying vehicle. To maximize longevity and minimize maintenance required by a track system of a track-laying vehicle, tension on the track must be optimized. A commonly used method for adjusting track tension on a track-laying vehicle involves making one of the track sprockets (in a positively driven system) or wheels or pulleys (in a frictionally driven system) adjustable in a way which enables tension to be applied to the track. Often, such systems make use of a grease cylinder, wherein grease is pumped into the cylinder which extends a cylinder arm and positions the track sprocket, wheel or pulley to tighten the track. If too much grease is pumped into the grease cylinder, grease must be removed from the cylinder by a relief mechanism.

Figure 3:
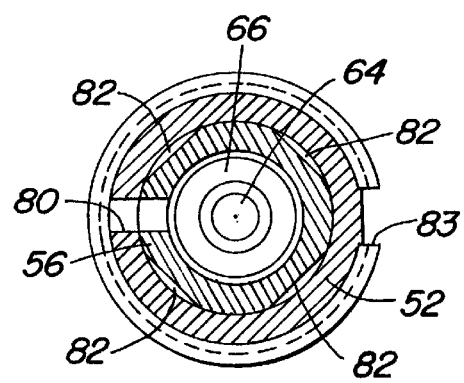
FIG. 3 is a cross sectional view taken along line 3—3 of FIG. 2.
Figure 4:
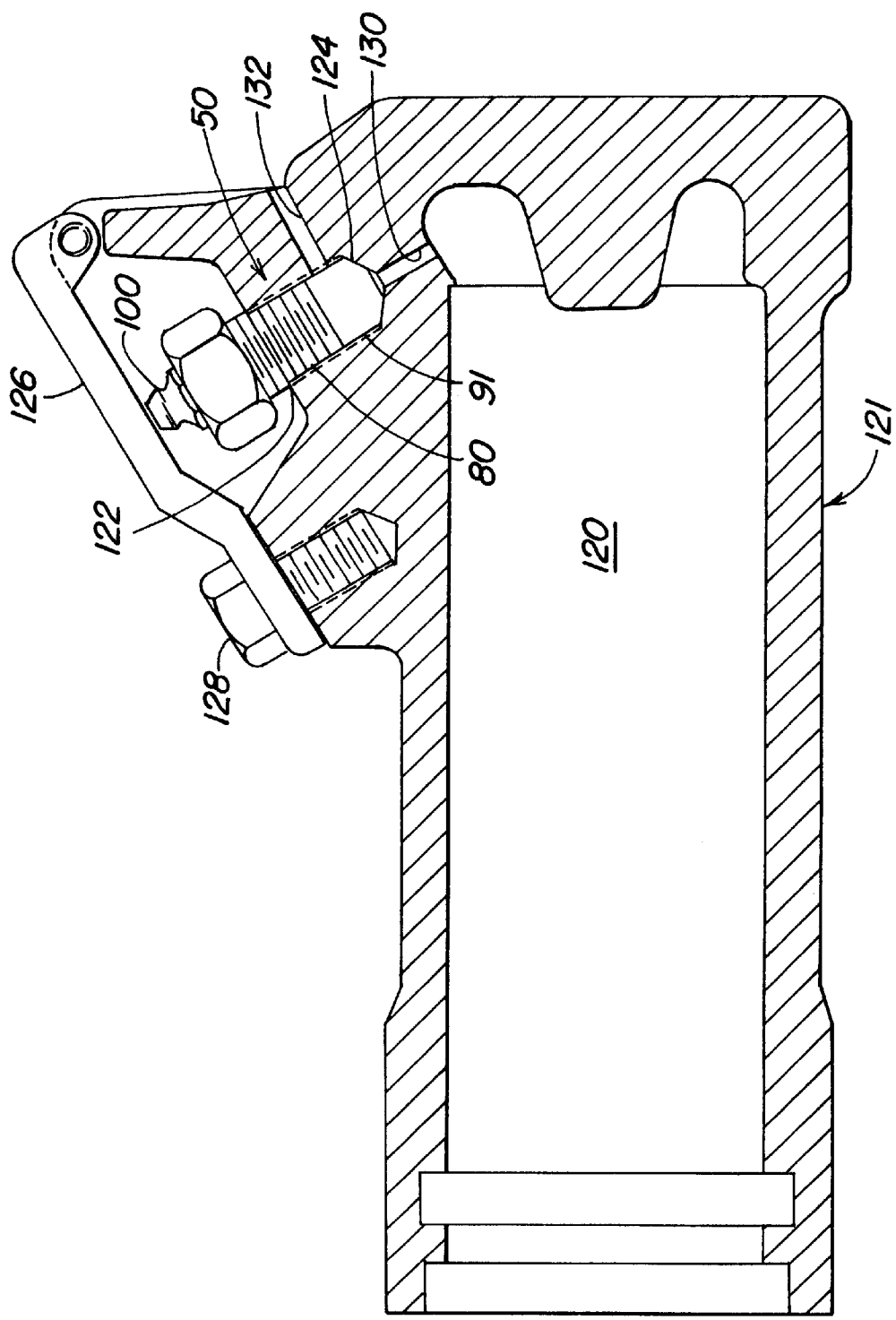
FIG. 4 is a cross sectional view of a track adjuster cylinder serving as a fluid chamber fitted with the combined relief and fill valve of FIG. 2.

FIG. 4 shows such an environment including a grease cylinder 121 having a fluid chamber 120. Fluid pressure is used to move a piston (not shown) leftward as viewed in FIG. 4 to increase tension on a track system. The valve of FIGS. 2 and 3 is threaded into a chamber valve bore 122 of the cylinder 121 so that the base 104 sealingly engages a housing seat 124. Because equipment of this nature is often operated in extreme conditions such as muddy, dusty or wet locations, a lid 126 is held in place over the valve 50 with a capscrew 128 as an extra measure of protection for the valve 50.

As grease is introduced through the valve 50 as described previously with respect to FIGS. 2 and 3, it passes into the fluid chamber 120 through a chamber fill bore 130. If pressure in the fluid chamber 120 rises above a desired level preset by adjustment of the relief valve spring 66, the relief valve assembly 60 will open and grease will pass through to the transverse relief port 80. External threads 81 on the housing 52 are interrupted at the location of the transverse relief port 80 as seen in FIG. 2, allowing grease to flow around the housing 52 to a keyway 83 cut into the threads 81. The keyway 83 carries grease past the threads 81 to an unthreaded portion 91 of the housing 52 which provides a clearance between the valve 50 and the chamber valve bore 122, allowing the grease to pass into a chamber relief bore 132 which vents the grease to the atmosphere.

The base 104 of the valve 50 may be unseated by beginning to unscrew the valve 50 slightly from the chamber valve bore 122 so that the base 104 is disengaged from the housing seat 124. The threads 81 prevent passage of grease through the chamber valve bore 122 past the valve 50 but allow passage past the unthreaded portion 91 of the housing 52 to the chamber relief bore 132. Therefore, manual relief of pressure from the fluid chamber 120 may be easily accomplished and will automatically occur as the valve 50 is removed from the grease cylinder 121.

The present invention should not be limited by the above-described embodiments, but should be limited solely by the claims that follow.

We claim:

1. A combined fill and relief valve for a fluid chamber containing grease under pressure relative to surrounding atmosphere, said valve comprising:

a housing having a longitudinal bore, said longitudinal bore including a first end forming an inlet and a second end forming an outlet;

a grease fitting fixed to the housing against movement relative thereto, said fitting in fluid communication with the longitudinal bore;

fill valve assembly fitted in the longitudinal bore and selectively permitting flow therethrough from the inlet to the outlet;

said housing having transverse relief port in fluid communication the atmosphere; and a relief valve assembly fitted in the longitudinal bore and controlling fluid passage between the outlet and the relief port.

2. The fill and relief valve of claim 1 wherein the fill valve assembly includes a fill valve element, a fill valve seat and a fill valve spring, said fill valve assembly having a closed position wherein the fill valve element is in fluid-tight engagement with the fill valve seat and an open position wherein the fill valve element is disengaged from the fill valve seat, said fill salve assembly is biased toward its closed position by the fill valve spring.

3. The fill and relief valve of claim 2 wherein the fill valve element is a check ball.

4. The fill and relief valve of claim 1 wherein the relief valve assembly includes a relief valve element, a relief valve seat and a relief valve spring, said relief valve assembly having a closed position wherein the relief valve element is in fluid-tight engagement with the relief valve seat and an open position wherein the relief valve element is disengaged from the relief valve seat.

5. The fill and relief valve of claim 4 wherein the relief valve element is a check ball.

6. A combined fill and relief valve for a fluid chamber containing grease under pressure relative to surrounding atmosphere, said valve comprising:

a housing having a longitudinal bore, said longitudinal bore including a first end forming an inlet and a second end forming an outlet;

a grease fitting fixed to the housing against movement relative thereto, said fitting in fluid communication with the longitudinal bore;

said housing having transverse relief port in fluid communication with the atmosphere;

a fluid fill path including the grease fitting, the longitudinal bore and the outlet;

a fill valve assembly fitted in the fluid fill path and selectively permitting flow therethrough;

a fluid relief path including the outlet, the longitudinal bore and the transverse relief port; and a relief valve assembly fitted in the fluid relief path and controlling fluid passage therethrough.

7. The fill and relief valve of claim 6 wherein the fill valve assembly includes a fill valve element, a fill valve seat and a fill valve spring, said fill valve assembly having a closed position wherein the fill valve element is in fluid-tight engagement with the fill valve seat and an open position wherein the fill valve element is disengaged from the fill valve seat, said fill valve assembly is biased toward its closed position by the fill valve spring.

8. The fill and relief valve of claim 7 wherein the fill valve element is a check ball.

9. The fill and relief valve of claim 6 wherein the relief valve assembly includes a relief valve element, a relief valve seat and a relief valve spring, said relief valve assembly having a closed position wherein the relief valve element is in fluid-tight engagement with the relief valve seat and an open position wherein the relief valve element is disengaged from the relief valve seat.

10. The fill and relief valve of claim 9 wherein the relief valve element is a check ball.

11. The fill and relief valve of claim 6 wherein the relief valve assembly is confined entirely within the housing in both its open and closed positions.

12. The fill and relief valve of claim 6 wherein the fluid chamber is defined by a fluid camber housing having a chamber relief bore and a chamber valve bore including a housing seat for receiving the housing; the housing including a base and having a seated position wherein the base is sealingly engaged with the housing seat, preventing communication between the fluid chamber and the chamber relief bore, and an unseated position wherein the base is spaced apart from the housing seat, allowing fluid communication between the fluid chamber and the chamber relief bore.

13. The fill and relief valve of claim 1 wherein the fill valve assembly selectively permits flow responsive to a fluid pressure level at the inlet, said fill valve assembly being adjustable for determining the pressure level at which the fill valve assembly responds to permit flow.

14. The fill and relief valve of claim 1 or 13 wherein the relief valve assembly electively permits flow responsive to a fluid pressure level at the inlet, said relief valve assembly being adjustable for determining the pressure level at which the relief valve assembly responds to permit flow.

15. The fill and relief valve of claim 6 wherein the fill valve assembly selectively permits flow responsive to a fluid pressure level at the inlet, said fill valve assembly being adjustable for determining the pressure level at which the fill valve assembly responds to permit flow.

16. The fill and relief valve of claim 6 or 15 wherein the relief valve assembly selectively permits flow responsive to a fluid pressure level at the inlet, said relief valve assembly being adjustable for determining the pressure level at which the relief valve assembly responds to permit flow.

17. The fill and relief valve of claim 1 wherein the grease fitting is removable from the housing without permitting pressurized grease to flow from the housing through the inlet.

18. The fill and relief valve of claim 6 wherein the grease fitting is removable from the housing without permitting pressurized grease to flow from the housing through the inlet.

* * * * *

UNITED STATES PATENT AND TRADEMARK OFFICE
CERTIFICATE OF CORRECTION

PATENT NO. : 6,079,519
DATED : June 27, 2000
INVENTOR(S) : Robert Emil Lottes

It is certified that error appears in the above-identified patent and that said Letters Patent is hereby corrected as shown below:

Column 5,
Line 64, delete "salve" and insert -- valve --.

Column 6,
Line 53, delete "camber" and insert -- chamber --.

Column 7,
Line 2, delete "electively" and insert -- selectively --.

Signed and Sealed this

Fourth Day of June, 2002

Attest:

JAMES E. ROGAN
Attesting Officer
Director of the United States Patent and Trademark Office